United States Patent
Fetterman et al.

(10) Patent No.: US 10,571,148 B2
(45) Date of Patent: Feb. 25, 2020

(54) COGNITIVE SOLUTION FOR MICROENVIRONMENT

(71) Applicant: International Business Machines Corporation, Armonk, NY (US)

(72) Inventors: Mary T. Fetterman, Endwell, NY (US); Kathleen M. Pfeiffer, Hurley, NY (US); Robert F. Pfeiffer, Hurley, NY (US); Anne M. Romanowski, Endicott, NY (US); Philip A. Siconolfi, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 67 days.

(21) Appl. No.: 15/884,430

(22) Filed: Jan. 31, 2018

(65) Prior Publication Data

US 2019/0234642 A1  Aug. 1, 2019

(51) Int. Cl.
*G05B 13/00* (2006.01)
*F24F 11/64* (2018.01)
(Continued)

(52) U.S. Cl.
CPC ............ *F24F 11/64* (2018.01); *F24F 11/58* (2018.01); *F24F 11/59* (2018.01); *G05B 13/028* (2013.01); *F24F 2120/20* (2018.01)

(58) Field of Classification Search
CPC ................................................ F24F 11/0086
(Continued)

(56) References Cited

U.S. PATENT DOCUMENTS

| 4,480,312 A | 10/1984 | Wingate |
| 8,326,568 B2 | 12/2012 | Hsu et al. |

(Continued)

FOREIGN PATENT DOCUMENTS

| CN | 202392949 U | 8/2012 |
| WO | 2015061429 A1 | 4/2015 |

(Continued)

OTHER PUBLICATIONS

Felice, Al and cognitive computing: how to distinguish the real value proposition, 2016, Knowledge Management in Context, pp. 5 (Year: 2016).*

(Continued)

*Primary Examiner* — Suresh Suryawanshi
(74) *Attorney, Agent, or Firm* — Edward P. Li

(57) ABSTRACT

A method, a computer program product, and a computer system for providing a cognitive solution for maintaining a microenvironment. A cognitive service in an infrastructural computing system receives from a user computing device data of one or more sensors in the microenvironment. The cognitive service receives from the user computing device a profile of a user of the microenvironment. The cognitive service determines one or more current conditions of the microenvironment, based on the data of the one or more sensors. The cognitive service determines a cognitive solution for maintaining the microenvironment, based on the profile of the user and the one or more current conditions of the microenvironment. The cognitive service sends to the user computing device the cognitive solution. The user computing device adjusts one or more devices based on the cognitive solution.

20 Claims, 6 Drawing Sheets

(51) Int. Cl.
*G05B 13/02* (2006.01)
*F24F 11/58* (2018.01)
*F24F 11/59* (2018.01)
*F24F 120/20* (2018.01)

(58) Field of Classification Search
USPC .......................................................... 700/276
See application file for complete search history.

(56) References Cited

U.S. PATENT DOCUMENTS

| | | | | |
|---|---|---|---|---|
| 9,465,392 | B2* | 10/2016 | Bradley | F24F 11/0001 |
| 9,717,607 | B1* | 8/2017 | Bostick | A61F 2/70 |
| 9,773,388 | B1* | 9/2017 | Baughman | G08B 5/36 |
| 9,811,102 | B2* | 11/2017 | Gulli' | G05F 1/66 |
| 9,909,774 | B2* | 3/2018 | Cheatham, III | G05B 15/02 |
| 2010/0211224 | A1 | 8/2010 | Keeling et al. | |
| 2013/0271290 | A1 | 10/2013 | Saenz et al. | |
| 2014/0372360 | A1 | 12/2014 | Asrani | |
| 2016/0004243 | A1* | 1/2016 | Flitsch | H01L 21/67178 700/112 |
| 2016/0116178 | A1 | 4/2016 | Vega et al. | |
| 2016/0138819 | A1 | 5/2016 | Vega et al. | |
| 2016/0170967 | A1* | 6/2016 | Allen | G10L 25/63 704/9 |
| 2016/0195856 | A1* | 7/2016 | Spero | G06N 5/046 700/90 |
| 2017/0109390 | A1* | 4/2017 | Bradley | G06F 16/335 |
| 2017/0212928 | A1* | 7/2017 | Abebe | G06F 16/2453 |
| 2017/0364805 | A1* | 12/2017 | Boyer | G06F 16/3329 |
| 2018/0266716 | A1* | 9/2018 | Bender | F24F 11/63 |

FOREIGN PATENT DOCUMENTS

| | | |
|---|---|---|
| WO | 2016005512 A | 1/2016 |
| WO | 2016036062 A1 | 10/2016 |

OTHER PUBLICATIONS

Shah, Robotic Process Automation with Artificial Intelligence, 2017, Tech Talks by Amit, pp. 4 (Year: 217).*
Mell et al. "The NIST Definition of Cloud Computing Recommendations of the National Institute of Standards and Technology". NIST Special Publication 800-145. Sep. 2011. Gaithersburg, MD.

* cited by examiner

COGNITIVE SOLUTION FOR MICROENVIRONMENT

BACKGROUND

The present invention relates generally to a cognitive system for a microenvironment, and more particularly to a cognitive system using a cognitive service in an infrastructural computing system to maintain a microenvironment.

Companies and homes are unnecessarily wasting energy, and there are no smart solutions that leverage internal and external environmental trends (such as the weather outside and the amount of people in a room) to adjust the inside conditions of a microenvironment (such as a building, a home, or an apartment). Microenvironments are not smart enough to anticipate or react to changes in external and internal environmental conditions. Not only are energy and money wasted, but also individuals experience certain health issues if factors such as allergens are not dealt with.

Currently, many microenvironments such as homes, building structures, cars, buses, and planes cannot automatically adjust themselves independent of user input. These microenvironments contain manual systems to control temperature and have sensors to detect issues such as an increase in carbon monoxide, but cannot initiate actions to adjust themselves.

The current state of the art for indoor temperature control is that temperature can be set manually. A thermostat can learn specific times when a user wants the temperature at a certain degree. A thermostat can know when a user is not in the microenvironment by accessing the user's geolocation. The current state of the art for air quality sensors can alert a user that there is an issue such as an increase in radon or carbon dioxide.

SUMMARY

In one aspect, a method for providing a cognitive solution for maintaining a microenvironment is provided. The method comprises receiving data of one or more sensors in the microenvironment, from a user computing device, by a cognitive service in an infrastructural computing system, wherein the data of the one or more sensors is collected by the user computing device. The method further comprises receiving a profile of a user of the microenvironment, from the user computing device, by the cognitive service, wherein the profile comprises user preferred ranges of one or more conditions of the microenvironment. The method further comprises determining, by the cognitive service, one or more current conditions of the microenvironment, based on the data of the one or more sensors. The method further comprises determining, by the cognitive service, a cognitive solution for maintaining the microenvironment, based on the profile of the user and the one or more current conditions of the microenvironment, wherein the cognitive solution satisfies the user preferred ranges and saves energy. The method further comprises sending to the user computing device, by the cognitive service, the cognitive solution. The method further comprises wherein the user computing device adjusts one or more devices in the microenvironment based on the cognitive solution.

In another aspect, a computer program product for providing a cognitive solution for maintaining a microenvironment is provided. The computer program product comprising one or more computer-readable tangible storage devices and program instructions stored on at least one of the one or more computer-readable tangible storage devices. The program instructions are executable to: receive data of one or more sensors in the microenvironment, from a user computing device, by a cognitive service in an infrastructural computing system, wherein the data of the one or more sensors is collected by the user computing device; receive a profile of a user of the microenvironment, from the user computing device, by the cognitive service, wherein the profile comprises user preferred ranges of one or more conditions of the microenvironment; determine, by the cognitive service, one or more current conditions of the microenvironment, based on the data of the one or more sensors; determine, by the cognitive service, a cognitive solution for maintaining the microenvironment, based on the profile of the user and the one or more current conditions of the microenvironment, wherein the cognitive solution satisfies the user preferred ranges and saves energy; and send to the user computing device, by the cognitive service, the cognitive solution. The user computing device adjusts one or more devices in the microenvironment based on the cognitive solution.

In yet another aspect, a computer system for providing a cognitive solution for maintaining a microenvironment is provided. The computer system comprises one or more processors, one or more computer readable tangible storage devices, and program instructions stored on at least one of the one or more computer readable tangible storage devices for execution by at least one of the one or more processors. The program instructions are executable to receive data of one or more sensors in the microenvironment, from a user computing device, by a cognitive service in an infrastructural computing system, wherein the data of the one or more sensors is collected by the user computing device. The program instructions are further executable to receive a profile of a user of the microenvironment, from the user computing device, by the cognitive service, wherein the profile comprises user preferred ranges of one or more conditions of the microenvironment. The program instructions are further executable to determine, by the cognitive service, one or more current conditions of the microenvironment, based on the data of the one or more sensors. The program instructions are further executable to determine, by the cognitive service, a cognitive solution for maintaining the microenvironment, based on the profile of the user and the one or more current conditions of the microenvironment, wherein the cognitive solution satisfies the user preferred ranges and saves energy. The program instructions are further executable to send to the user computing device, by the cognitive service, the cognitive solution. The user computing device adjusts one or more devices in the microenvironment based on the cognitive solution.

DETAILED DESCRIPTION

Figure 1:
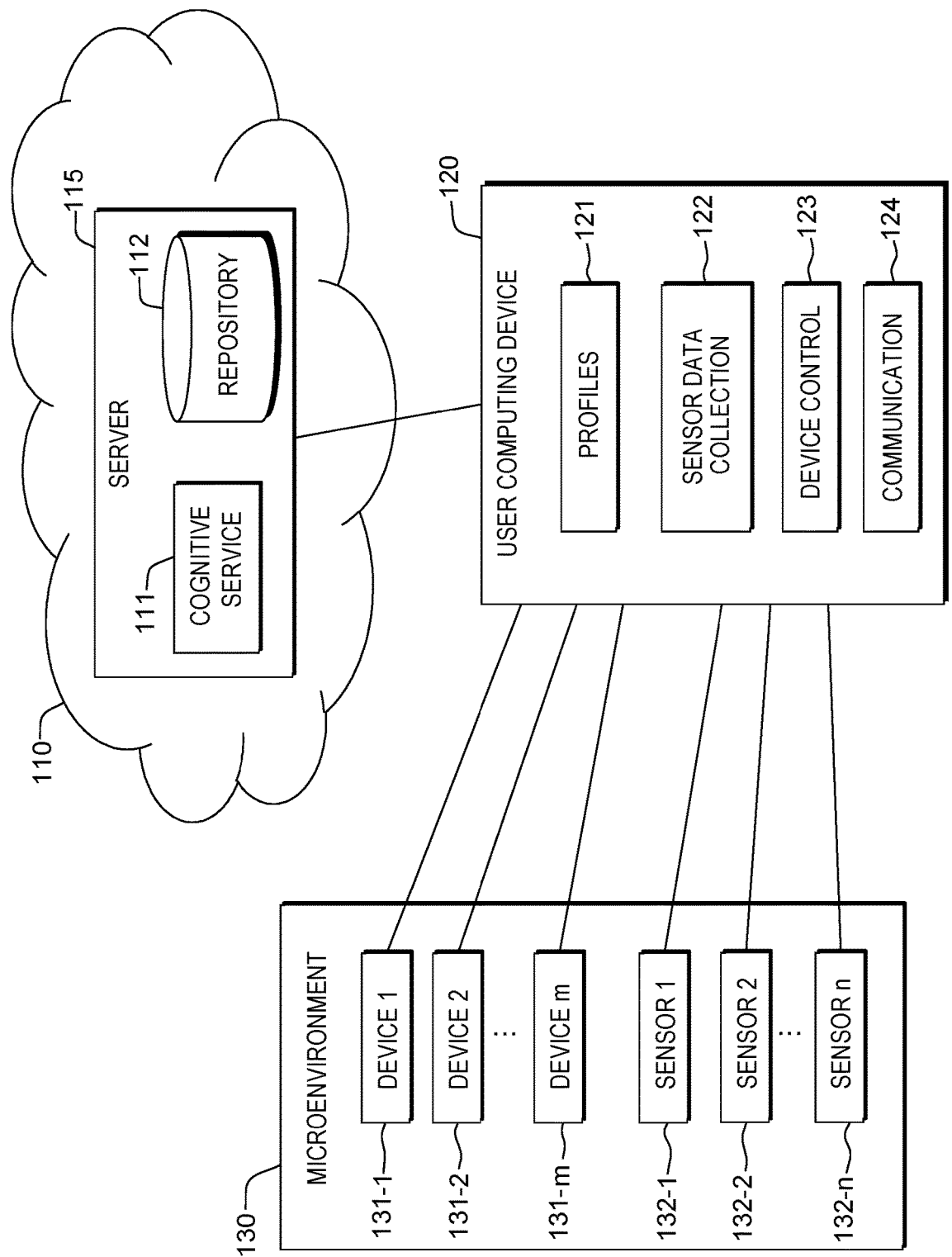
FIG. 1 is a systematic diagram illustrating a cognitive system using a cognitive service in an infrastructural computing system to maintain a microenvironment, in accordance with one embodiment of the present invention.

Embodiments of the present invention disclose a cognitive system that learns and understands what constitutes a microenvironment (such as a building, a house, an apartment, a train, a car, an airplane, or any area where a microenvironment can be altered) and learns specific trends in order to optimally heat, cool, and/or maintain normal air quality using sensor technology. Optimally maintaining the microenvironment satisfies user's preference and simultaneously meets economical and/or ecological goals. With the cognitive system, a user sets a preferred range of conditions for the microenvironment through a profile specific to the user. For example, using outdoor and indoor sensors, the cognitive system considers outside conditions, such as temperature, humidity, barometric pressure, air quality, and pollen count. Using a cognitive service in an infrastructural computing system, the cognitive system determines effects of the outside conditions on the microenvironment. Using a cognitive service in an infrastructural computing system, the cognitive system determines the best way or most effective way to maintain the microenvironment according to user's preferred settings in the profile. For example, using the cognitive Bluemix® service called Watson Tradeoff Analytics, the cognitive system is able to determine a best way to maintain the microenvironment. Watson Tradeoff Analytics is a service that helps people make decisions when balancing multiple objectives. The service uses a mathematical filtering technique called Pareto optimization which enables users to explore tradeoffs when considering multiple criteria for a single decision.

Embodiments of the present invention disclose a cognitive system that uses individualized profiles to allow for many personalized microenvironment preferences within an overall environment. The cognitive system uses profiles that can be customized depending on different user health conditions, preferences, and/or needs. When a user enters a microenvironment space, the microenvironment will be adjusted by the cognitive system based on the user's profile. If there exist multiple profiles for respective users of the microenvironment, the cognitive system will determine a cognitive solution based on a profile that is ranked highest. For example, multiple persons in a living room, one person's preferred setting may take priority over other's preferred settings. A profile may include preferences, such as whether the user is focused on cost savings and being eco-friendly, and/or whether the user requires adjustments for certain allergens and pollutants. The cognitive system understands individual needs and adjusts dynamically depending on the profiles of users. The cognitive system is also able to generate and maintain individual preference profiles based on historical individual feedback.

In an example, a user in a home sets a preferred setting for the microenvironment. The preferred setting may include an optimal temperature range, a pollen range, and an air quality range. For instance, in a cool winter day, the cognitive system receives information indicating that it is going to be 30 degrees Fahrenheit outside and the user in the home desires to maintain the indoor temperature between 68-70 degrees Fahrenheit. The cognitive system also receives data indicating that the day will be very sunny. The cognitive system determines that the most optimal way to heat the house for the least amount of energy expenditure will be opening up all of the blinds to let the natural solar light warm the house. Later, however, the cognitive system detects that the indoor air quality is not as high as the user desires and the temperature has risen above the acceptable range. The cognitive system now determines that the outdoor allergen level was low today and that the specific outdoor allergens that the user is allergic to are not present, and then the cognitive system determines to open windows to refresh the air quality and get the temperature back in range. Now, without expending any additional energy to heat the home or filter the indoor air, the home is exactly at the optimal environment desired by the user in the home. In one embodiment, the above-mentioned Watson Tradeoff Analytics is used in this example to make determinations based on the user's setting in order to reach the user's goal. If the allergy count is high in that day, the cognitive system may provide a solution that the windows will only be opened in short increments, or the cognitive system may provide a solution that a home's allergy ionizer is turned on to remove the pollen from the air. The cognitive solution requires less energy consumption. Watson Tradeoff Analytics allows the cognitive system to compare all of the data and different scenarios to make a decision.

Another use case is the application of the cognitive system in a business. In a building having specific areas that need different types of microenvironment control. The cognitive system understands that areas such as loading docks will have different settings from a conference room. A company may establish a profile by feeding data about when a loading dock door is open and when it is closed. The profile allows the cognitive system to make a decision by considering different factors. A loading dock is able to handle a much bigger range of environmental factors such as temperature, humidity, and pollen count when it is opened, because the air is exchanged (escaping and entering). The cognitive system determines when to expend energy to meet the microenvironment requirements set in the profile and when to save energy. The cognitive system may also be applied to a conference room. If there is a very packed conference room, the cognitive system will consider total body temperature for the inhabitants and how much energy a human is releasing. Thus, the cognitive system may provide a solution that does not have to use much heat in the conference room to maintain a desired state.

The cognitive system can also be beneficial in areas of where extreme physical activity takes place because managing physical activity for many people in a closed space can lead to a depletion of oxygen, causing people to faint. If the cognitive system monitors how much oxygen is taken from the air and replaced with carbon dioxide, the cognitive system is able to compensate.

Another advantage of the cognitive system is that the cognitive system detects changes in a microenvironment. For example, if a pipe bursts, the cognitive system is able to detect that something is changing in the microenvironment; through the use of sensors, cognitive system is able to detect where this disturbance occurs and alert the user that there is an environmental change. Furthermore, the cognitive system sends an alert that a user action must be taken. In a similar scenario, if there is a radon leak or carbon monoxide buildup, the cognitive system detects that the air quality is compromised and instantly to open windows and filter the air while alerting the user to leave the premises.

FIG. 1 is a systematic diagram illustrating a cognitive system using a cognitive service 111 in an infrastructural computing system 110 to maintain a microenvironment 130, in accordance with one embodiment of the present invention. The cognitive system comprises the infrastructural computing system 110, a user computing device 120, and the microenvironment 130.

Referring to FIG. 1, the microenvironment 130 may be a building, a house, or an apartment, and may be a unit within the building, the house, the apartment, a train, a car, an airplane, or any area where a microenvironment can be altered. The microenvironment 130 comprises one or more devices, such as m devices shown in FIG. 1—device 1 (131-1), device 2 (131-2), and through device m (131-m). For example, the devices may be a heater, an air conditioner, an air filter, an automatic mechanical device for window opening, etc. The microenvironment 130 further comprises one or more sensors, such as n sensors shown in FIG. 1—sensor 1 (132-1), sensor 2 (132-2), and through sensor n (132-n). For example, the sensors may be thermometers which measure temperatures inside and/or outside the microenvironment 130, a carbon dioxide monitor which measures a quantity of carbon dioxide inside the microenvironment 130, an oxygen content monitor which measuring a quantity of oxygen inside the microenvironment 130, pollen content monitors which measure a quantity of pollens inside and/or outside the microenvironment 130, etc.

Referring to FIG. 1, the user computing device 120 may be a mobile device (such as a mobile phone, a laptop computer, a notebook computer, or a tablet). The user computing device 120 may be a desktop computer. The user computing device 120 may be a standalone controller of device 1 (131-1), device 2 (131-2), and through device m (131-m). The user computing device is described in more detail in later paragraphs with reference to FIG. 4.

Referring to FIG. 1, the user computing device 120 comprises user profiles 121. The user profiles are established for one or more specific users of the microenvironment 130 and include preferred ranges of conditions for the microenvironment and information of device 1 (131-1), device 2 (131-2), and through device m (131-m). The user computing device 120 allows a user to input and edit data of a profile on the user computing device 120. The profile is encrypted, so that the security is guaranteed when the profile is stored on the user computing device 120 and sent to cognitive service 111 from the user computing device 120. The user computing device 120 further comprises a program 122 for sensor data collection and the program 122 is configured to receive or retrieve data from one or more of sensor 1 (132-1), sensor 2 (132-2), and through sensor n (132-n). The user computing device 120 further comprises a program 123 for device control and the program 123 is configured to adjust one or more of device 1 (131-1), device 2 (131-2), and through device m (131-m). The user computing device 120 further comprises a program 124 for communication and the program 124 for communication is configured for the user computing device 120 to communicate with one or more of sensor 1 (132-1), sensor 2 (132-2), and through sensor n (132-n), to communicate with one or more of device 1 (131-1), device 2 (131-2), and through device m (131-m), and to communicate with the cognitive service 111 in the infrastructural computing system 110.

Referring to FIG. 1, the user computing device 120 communicates with sensor 1 (132-1), sensor 2 (132-2), and through sensor n (132-n); the user computing device 120 receives or retrieves monitoring data, for example, temperature inside and outside the microenvironment 130, carbon dioxide concentration inside and outside the microenvironment 130, and pollen quantities inside and outside the microenvironment 130.

Referring to FIG. 1, the user computing device 120 communicates with the cognitive service 111 in an infrastructural computing system 110. The user computing device 120 sends to the cognitive service 111 the monitoring data received or retrieved from one or more of sensor 1 (132-1), sensor 2 (132-2), and through sensor n (132-n). The user computing device 120 sends to the cognitive service 111 the user profile(s). From the cognitive service 111, the user computing device 120 receives a cognitive solution (which is determined by the cognitive service 111) for maintaining the microenvironment 130 within the user preferred ranges and with efficient energy consumption. The user computing device 120 adjusts the one or more of device 1 (131-1), device 2 (131-2), and through device m (131-m), based on the cognitive solution. The user computing device 120 adjusts the one or more of devices to maintain the microenvironment 130 according to the cognitive solution.

Referring to FIG. 1, the cognitive service 111 receives the user profile(s) and the sensor data from the user computing device 120. The cognitive service 111 determines a cognitive solution for maintaining the microenvironment 130; the cognitive solution satisfies the user preferred ranges and saves energy. The cognitive service 111 sends to the user computing device 120 the cognitive solution, which is to be used by the user computing device 120 to adjust the one or more of device 1 (131-1), device 2 (131-2), and through device m (131-m) in order to maintain the microenvironment 130 within the user preferred ranges and with efficient energy consumption.

The cognitive service 111 uses a cognitive ranking engine. The purpose of cognitive ranking engine is to determine which actions need to be taken in the microenvironment 130. The cognitive ranking engine uses profile data, sensor data, and available historical data, and then creates different possible scenarios from the set rankings. The cognitive ranking engine then feeds the resulting scenarios to an analytics service (such as Watson Tradeoff Analytics) for a final evaluation. Initially, the cognitive ranking engine is based on a ranking system in which actions that are closely aligned with user profile choices (and priorities) gain points and increase the ranking. The ranking system and solution are also aligned with the integrity of the microenvironment 130. Since the microenvironment 130 is always being monitored, a choice will not be made to destabilize the microenvironment 130, which is incorported into the point evaluation. Through constant feedback loops (these feedback loops determine the points of each action, the points are always changing) and machine learning, the cognitive ranking engine learns what constitutes a stable microenvironment and what actions can destabilize the microenvironment 130. For example, if the user profile is more closely aligned with being environmentally friendly, higher point values will be assigned to actions that align with the goals of being environmentally friendly. Lower or even negative values are assigned to actions that do not meet the user profile's criteria. So, the described ranking system will have a corpus of point values to start with for a set of provided (preconceived) scenarios. The machine learning is developed as different scenarios, resulting from profile use, are experienced (not part of the corpus of point values) and the cognitive ranking engine adjusts its corpus of values accordingly. Then, the sensor data combined with historical data is fed into the cognitive ranking engine. The data includes what is currently happening right now and what will most likely happen at a later time. For example, right now at 2:00 PM, the temperature is 85 degrees Fahrenheit, it is humid and raining; according to trends and historical data, it is projected that later the external conditions will change to 77 degrees Fahrenheit, the humidity will decrease, and the rain will stop. Different environmental scenarios like the one described above are essential for the cognitive ranking engine to determine the plausibility of any presented (or possible) scenario (view every angle of any potential situation). A possible result may be that 10 scenarios involving which actions the user prefers to be taken are then created by the cognitive ranking engine. Taking this a step further to be as accurate and granular as possible, the analytics service (such as Watson Tradeoff Analytics) can be used on the processed results to achieve a final ranking on which action needs to be taken (from all possible actions) based on the profile action rankings that are in the cognitive ranking engine. Since, in this example, the profile is geared towards being environmentally friendly, a possible scenario is that the user likes when the house is 75 degrees and would rather not have the AC running all day. The cognitive ranking engine determines that on a nice weather day just opening the windows can be fine response; however, there are 2 other factors today, rain and humidity. Therefore, in order to protect the integrity of the microenvironment 130 from humidity-based mold, it will be an optimal action to run the AC at 80 degrees for 2 hours. Then, once the rain stops and the temperature outside cools down, the windows can be opened to cool the house down to 75 degrees without using additional electricity. The cognitive ranking engine based on point value calculations is configured to know that protecting the house from mold is more valuable than not using the AC and waiting for the weather to cool down and the rain to stop. However, if after a decision is made other variables are introduced, such as the rain does not stop or the house reaches a stable mold free environment before the allotted time calculated is reached, then the cognitive ranking engine re-evaluates its actions.

Referring to FIG. 1, the infrastructural computing system 110 further comprises a repository 112. The cognitive service 111 replicates the user profile(s) on repository 112 for redundancy purpose. The historical data related to device 1 (131-1), device 2 (131-2), and through device m (131-*m*) is stored on repository 112. The historical data related to sensor 1 (132-1), sensor 2 (132-2), and through sensor n (132-*n*) is also stored on repository 112.

The cognitive service 111 and the repository 112 reside on a server 115 in the infrastructural computing system 110. In one embodiment, the cognitive service 111 and the repository 112 reside on a physical machine as a server in the infrastructural computing system 110. The physical machine is a computing device which is described in more detail in later paragraphs with reference to FIG. 4. In another embodiment, the cognitive service 111 and the repository 112 reside on a virtual machine or another virtualization implementation as a server in the infrastructural computing system 110. The virtual machine or the virtualization implementation runs on a physical machine. The infrastructural computing system 110 is a cloud computing environment; a cloud computing environment is described in later paragraphs with reference to FIG. 5 and FIG. 6.

Figure 2:
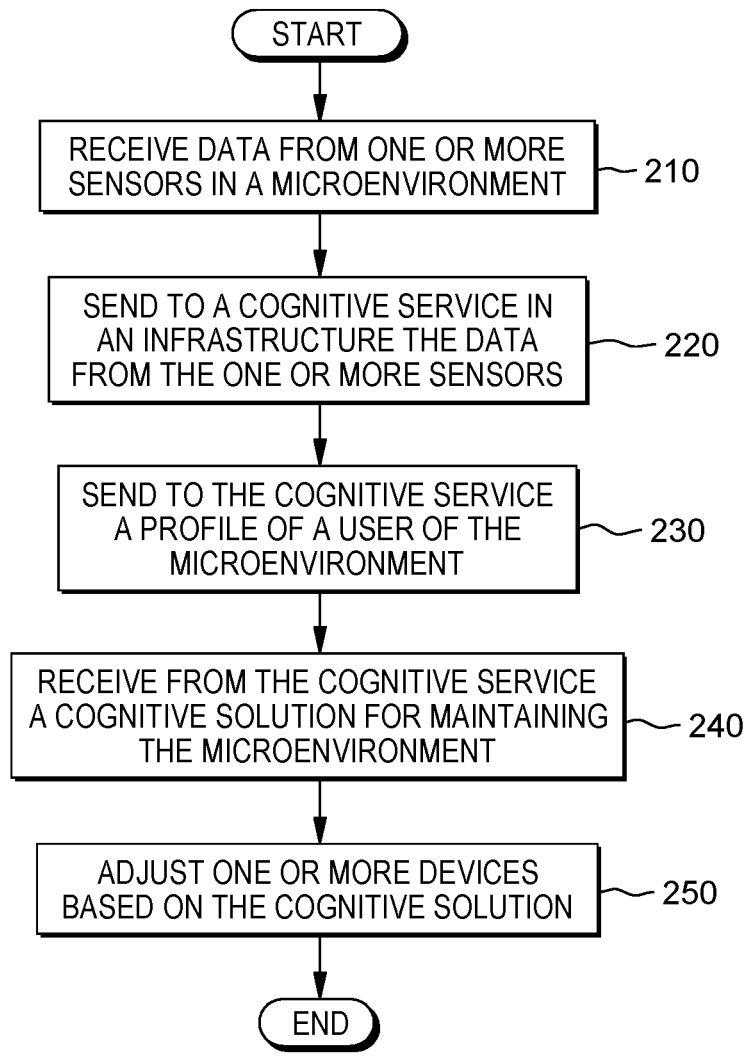
FIG. 2 is a flowchart showing operational steps for a user computing device using a cognitive service in an infrastructural computing system to maintain a microenvironment, in accordance with one embodiment of the present invention.

FIG. 2 is a flowchart showing operational steps for a user computing device 120 using a cognitive service 111 in an infrastructural computing system 110 to maintain a microenvironment 130, in accordance with one embodiment of the present invention. The operational steps are implemented by one or more processors on the user computing device 120.

At step 210, the user computing device 120 receives sensor data from one or more sensors, for example sensor 1 (132-1), sensor 2 (132-2), and through sensor n (132-*n*) shown in FIG. 1. The sensor data may also be retrieved from the one or more sensors. The sensor data may be, for example, temperature inside and outside the microenvironment 130, carbon dioxide concentration inside and outside the microenvironment 130, and pollen quantities inside and outside the microenvironment 130. At step 220, the user computing device 120 sends to the cognitive service 111 the sensor data received or retrieved by the user computing device 120 at step 210.

At step 230, the user computing device 120 sends to the cognitive service 111 a profile of a user of the microenvironment 130. The profile is set up by the user of the user of the microenvironment 130 and stored on the user computing device 120. The user profile includes preferred ranges of conditions for the microenvironment and also includes information of the devices, such as device 1 (131-1), device 2 (131-2), and through device m (131-*m*).

At step 240, the user computing device 120 receives from the cognitive service 111 a cognitive solution for maintaining the microenvironment 130. The cognitive solution satisfies the user preferred ranges and saves energy. The cognitive solution is provided by the cognitive service 111 and is determined by the cognitive service 111 based on the user profile sent by the user computing device 120 at step 230.

At step 250, the user computing device 120 adjusts the one or more of device 1 (131-1), device 2 (131-2), and through device m (131-*m*), according to the cognitive solution received by the user computing device 120 from the cognitive service 111. The user computing device 120 adjusts the one or more of devices to maintain the microenvironment 130 within the user preferred ranges and with efficient energy consumption.

Figure 3:
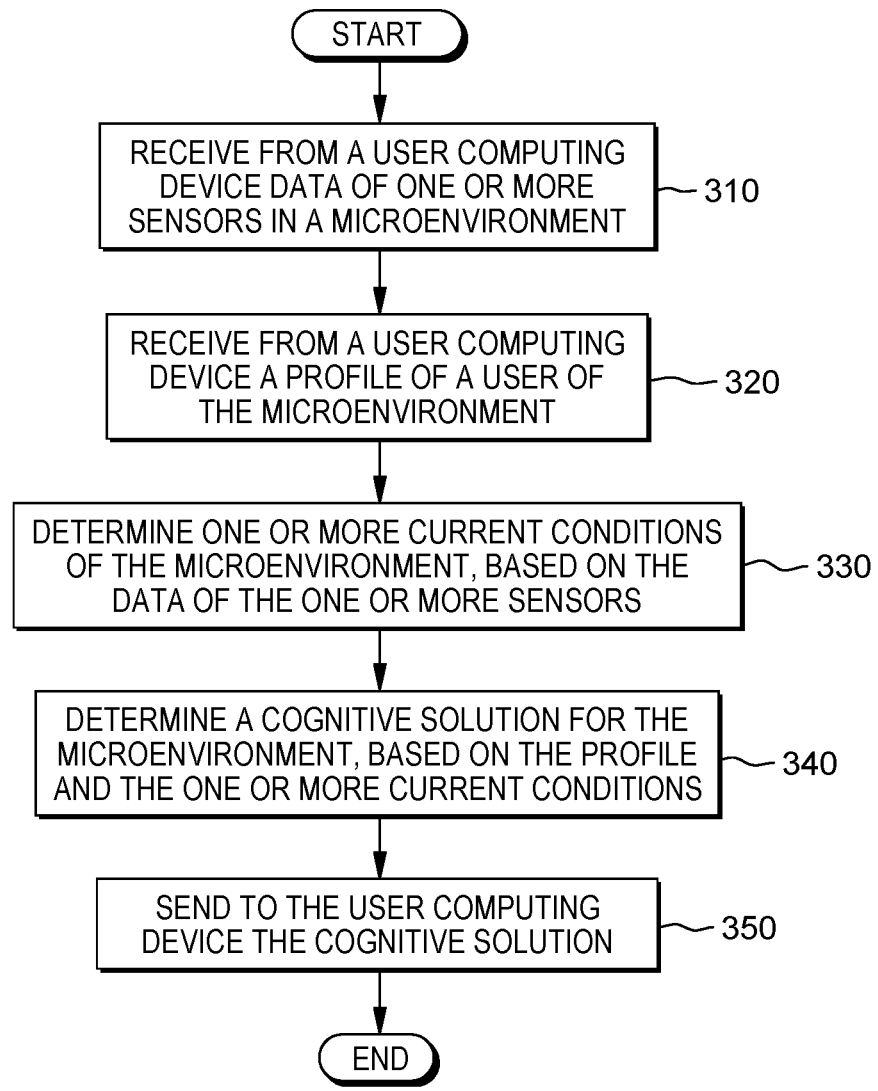
FIG. 3 is a flowchart showing operational steps for a cognitive service in an infrastructural computing system to provide a cognitive solution for maintaining a microenvironment, in accordance with one embodiment of the present invention.

FIG. 3 is a flowchart showing operational steps for a cognitive service 111 in an infrastructural computing system 110 to provide a cognitive solution for maintaining a microenvironment 130, in accordance with one embodiment of the present invention. The operational steps are implemented by one or more processors on a server 115.

At step 310, the cognitive service 111 on the server 115 receives from a user computing device 120 sensor data of one or more of sensor 1 (132-1), sensor 2 (132-2), and through sensor n (132-*n*) in the microenvironment 130 shown in FIG. 1. The sensor data is received or retrieved from the one or more of sensor 1 (132-1), sensor 2 (132-2), and through sensor n (132-*n*) by the user computing device 120, and then sent from the user computing device 120 to the cognitive service 111 on the server 115.

At step 320, the cognitive service 111 on the server 115 receives from the user computing device 120 a profile of a user of the microenvironment 130. The user profile includes preferred ranges of conditions for the microenvironment and further includes information of devices, such as device 1 (131-1), device 2 (131-2), and through device m (131-*m*).

At step 330, the cognitive service 111 on the server 115 determines one or more current conditions of the microenvironment 130, based on the sensor data of the one or more of sensor 1 (132-1), sensor 2 (132-2), and through sensor n (132-*n*). The sensor data is received from the user computing device 120 at step 310.

At step 340, the cognitive service 111 on the server 115 determines a cognitive solution for maintaining the microenvironment 130, based on the user profile received by the cognitive service 111 from the user computing device 120 at step 320 and based the one or more current conditions of the microenvironment 130 which are determined by the cognitive service 111 at step 330. For example, the cognitive service 111 uses Watson Tradeoff Analytics to make decisions when balancing multiple objectives. The cognitive solution satisfies the user preferred ranges and saves energy.

At step 340, the cognitive service 111 on the server 115 sends to the user computing device 120 the cognitive solution. As described in a previous graph with reference to FIG. 2, based on the cognitive solution, the user computing device 120 adjusts the one or more of device 1 (131-1), device 2 (131-2), and through device m (131-m).

Figure 4:
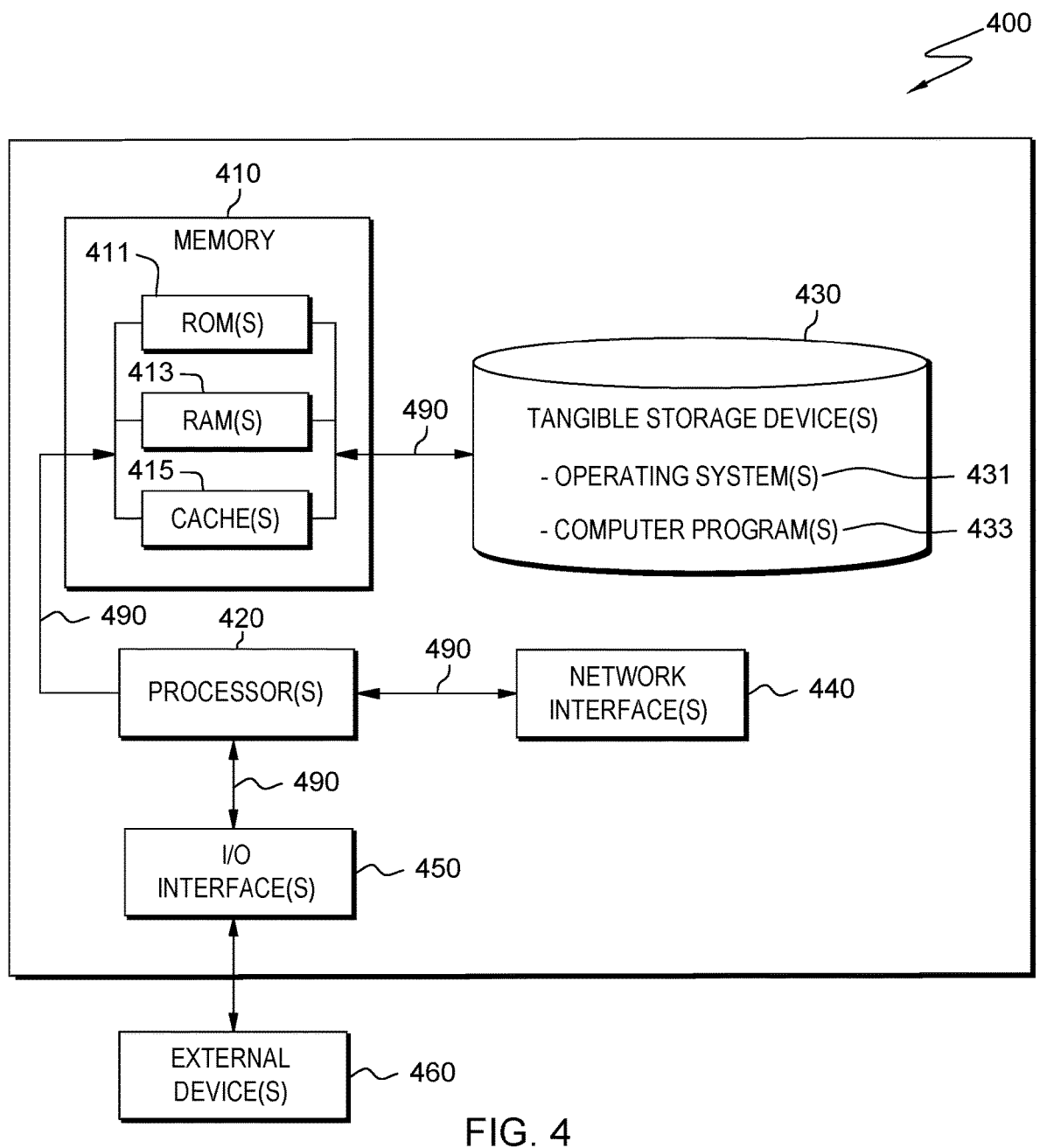
FIG. 4 is a diagram illustrating components of a computing device or a server shown in FIG. 1, in accordance with one embodiment of the present invention.

FIG. 4 is a diagram illustrating components of computing device 400 (such as the user computing device 120 and the server 115 shown in FIG. 1), in accordance with one embodiment of the present invention. It should be appreciated that FIG. 4 provides only an illustration of one implementation and does not imply any limitations with regard to the environment in which different embodiments may be implemented.

Referring to FIG. 4, computing device 400 includes processor(s) 420, memory 410, and tangible storage device(s) 430. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
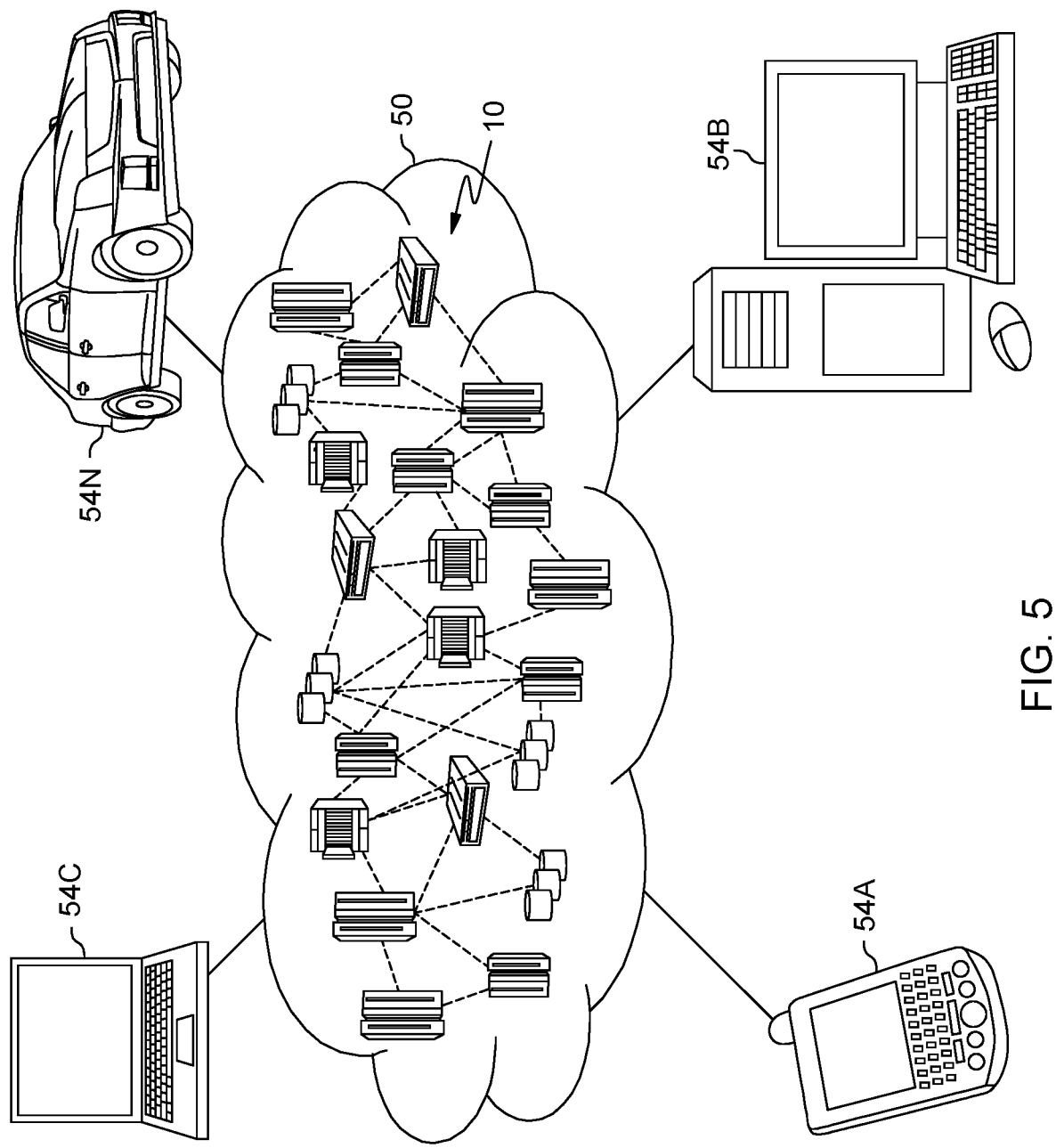
FIG. 5 depicts a cloud infrastructure environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
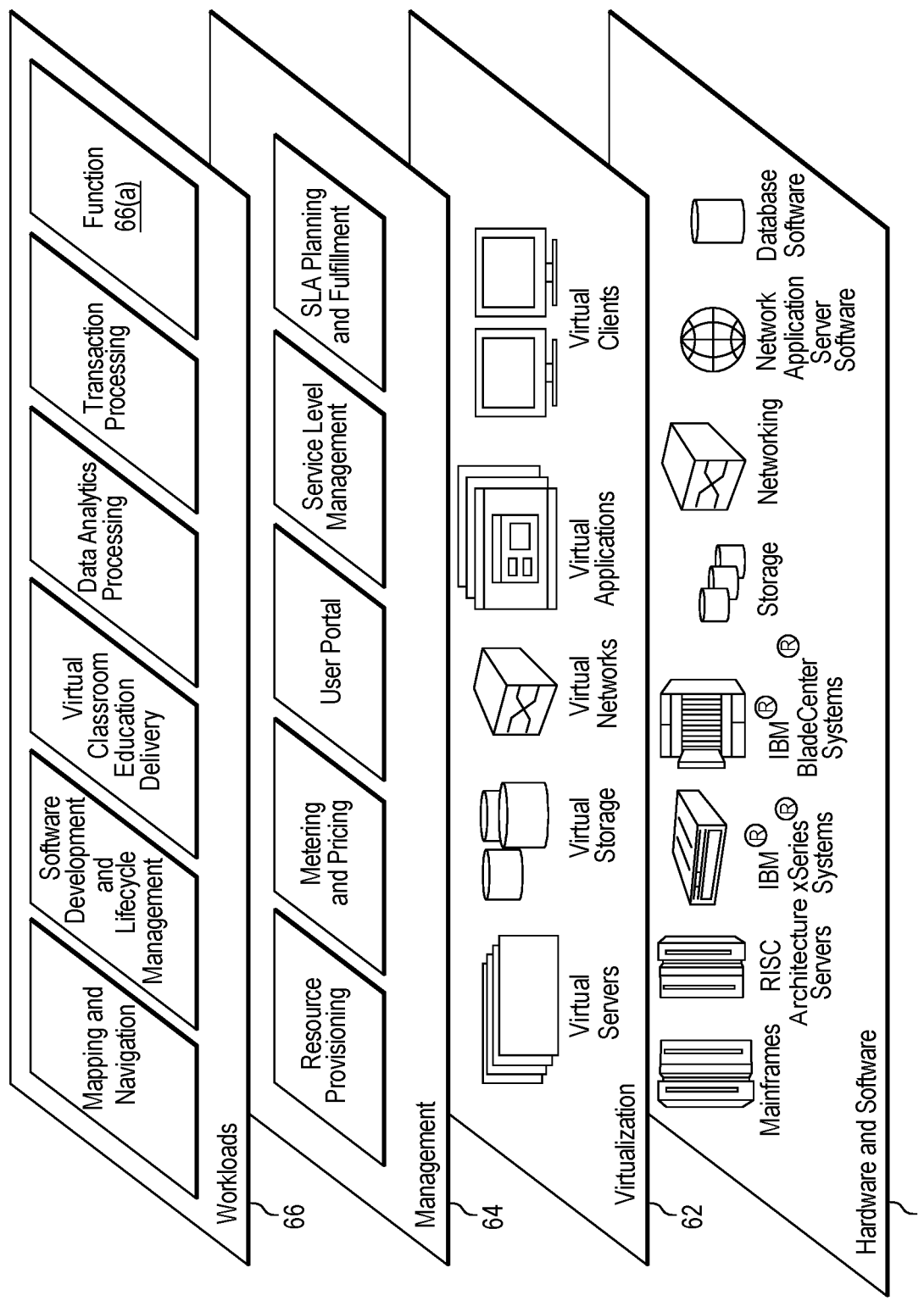
FIG. 6 depicts abstraction model layers in a cloud infrastructure environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality of the cognitive service 111 in the infrastructural computing system 110 shown in FIG. 1. The cognitive service 111 in the infrastructural computing system 110 has been discussed in detail in previous paragraphs of this document.

What is claimed is:

1. A method for providing a cognitive solution for maintaining a microenvironment, the method comprising:
   receiving, from a user computing device, by a cognitive service in an infrastructural computing system, data of one or more indoor and outdoor sensors in the microenvironment, wherein the data of the one or more indoor and outdoor sensors is collected by the user computing device;
   receiving, from the user computing device, by the cognitive service, profile of user of the microenvironment, wherein the profile comprises user preferred ranges of one or more conditions of the microenvironment;
   determining, by the cognitive service, one or more current conditions of the microenvironment, based on the data of the one or more indoor and outdoor sensors;
   determining, by the cognitive service, effects of one or more outside conditions of the microenvironment, based on the data of the one or more indoor and outdoor sensors;
   determining, by the cognitive service, cognitive solutions for maintaining the microenvironment, based on the profile of the user, the one or more current conditions of the microenvironment, and effects of the one or more outside conditions of the microenvironment, wherein the cognitive solutions satisfy the user preferred ranges and saves energy;
   ranking, by the cognitive service, the cognitive solutions, based on how the cognitive solutions are closely aligned with the profile of the user;
   determining, by the cognitive service, a best cognitive solutions selected from the cognitive solutions, based on ranking;
   sending to the user computing device, by the cognitive service, the best cognitive solution; and
   wherein the user computing device adjusts one or more devices in the microenvironment based on the cognitive solution.

2. The method of claim 1, further comprising:
   receiving, by the user computing device, the data of the one or more indoor and outdoor sensors, the data of the one or more indoor and outdoor sensors being sent by the one or more indoor and outdoor sensors to the user computing device;
   sending to the cognitive service, by the user computing device, the data of the one or more indoor and outdoor sensors; and
   sending to the cognitive service, by the user computing device, the profile.

3. The method of claim 1, further comprising:
   retrieving, from the one or more indoor and outdoor sensors, by the user computing device, the data of the one or more indoor and outdoor sensors;
   sending to the cognitive service, by the user computing device, the data of the one or more indoor and outdoor sensors; and
   sending to the cognitive service, by the user computing device, the profile.

4. The method of claim 1, wherein receiving, from the cognitive service, by the user computing device, the cognitive solutions for maintaining the microenvironment; and
   adjusting, by the user computing device, the one or more devices based on the cognitive solutions.

5. The method of claim 1, wherein the profile of the user of the microenvironment is set up by the user on the user computing device.

6. The method of claim 1, wherein the profile of the user of the microenvironment is generated based on historical feedback of the user.

7. The method of claim 1, wherein, when multiple profiles exist for respective users of the microenvironment, the cognitive service determines the cognitive solutions based on one of the multiple profiles that is ranked highest.

8. A computer program product for providing a cognitive solution for maintaining a microenvironment, the computer program product comprising one or more computer-readable tangible storage devices and program instructions stored on at least one of the one or more computer-readable tangible storage devices, the program instructions executable to:
  receive, from a user computing device, by a cognitive service in an infrastructural computing system, data of one or more indoor and outdoor sensors in the microenvironment, wherein the data of the one or more indoor and outdoor sensors is collected by the user computing device;
  receive, from the user computing device, by the cognitive service, a profile of a user of the microenvironment, wherein the profile comprises user preferred ranges of one or more conditions of the microenvironment;
  determine, by the cognitive service, one or more current conditions of the microenvironment, based on the data of the one or more indoor and outdoor sensors;
  determine, by the cognitive service, effects of one or more outside conditions of the microenvironment, based on the data of the one or more indoor and outdoor sensors;
  determine, by the cognitive service, cognitive solutions for maintaining the microenvironment, based on the profile of the user the one or more current conditions of the microenvironment, and effects of the one or more outside conditions of the microenvironment, wherein the cognitive solutions satisfy the user preferred ranges and saves energy;
  rank, by the cognitive service, the cognitive solutions, based on how the cognitive solutions are closely aligned with the profile of the user;
  determine, by the cognitive service, a best cognitive solutions selected from the cognitive solutions, based on ranking;
  send to the user computing device, by the cognitive service, the best cognitive solution;
  wherein the user computing device adjusts one or more devices in the microenvironment based on the cognitive solution.

9. The computer program product of claim 8, further comprising the program instructions executable to:
  receive, by the user computing device, the data of the one or more indoor and outdoor sensors, the data of the one or more indoor and outdoor sensors being sent by the one or more indoor and outdoor sensors to the user computing device;
  send to the cognitive service, by the user computing device, the data of the one or more indoor and outdoor sensors; and
  send to the cognitive service, by the user computing device, the profile.

10. The computer program product of claim 8, further comprising the program instructions executable to:
  retrieve, from the one or more indoor and outdoor sensors, by the user computing device, the data of the one or more indoor and outdoor sensors;
  send to the cognitive service, by the user computing device, the data of the one or more indoor and outdoor sensors; and
  send to the cognitive service, by the user computing device, the profile.

11. The computer program product of claim 8, further comprising the program instructions executable to:
  receive, from the cognitive service, by the user computing device, the cognitive solutions for maintaining the microenvironment; and
  adjust, by the user computing device, the one or more devices based on the cognitive solutions.

12. The computer program product of claim 8, wherein the profile of the user of the microenvironment is set up by the user on the user computing device.

13. The computer program product of claim 8, wherein the profile of the user of the microenvironment is generated based on historical feedback of the user.

14. The computer program product of claim 8, wherein, when multiple profiles exist for respective users of the microenvironment, the cognitive service determines the cognitive solution based on one of the multiple profiles that is ranked highest.

15. A computer system for providing a cognitive solution for maintaining a microenvironment, the computer system comprising:
  one or more processors, one or more computer readable tangible storage devices, and program instructions stored on at least one of the one or more computer readable tangible storage devices for execution by at least one of the one or more processors, the program instructions executable to:
  receive, from a user computing device, by a cognitive service in an infrastructural computing system, data of one or more indoor and outdoor sensors in the microenvironment, wherein the data of the one or more indoor and outdoor sensors is collected by the user computing device;
  receive, from the user computing device, by the cognitive service, a profile of a user of the microenvironment, wherein the profile comprises user preferred ranges of one or more conditions of the microenvironment;
  determine, by the cognitive service, one or more current conditions of the microenvironment, based on the data of the one or more indoor and outdoor sensors;
  determine, by the cognitive service, effects of one or more outside conditions of the microenvironment, based on the data of the one or more indoor and outdoor sensors;
  determine, by the cognitive service, cognitive solutions for maintaining the microenvironment, based on the profile of the user the one or more current conditions of the microenvironment, and effects of the one or more outside conditions of the microenvironment, wherein the cognitive solutions satisfy the user preferred ranges and saves energy;
  rank, by the cognitive service, the cognitive solutions, based on how the cognitive solutions are closely aligned with the profile of the user;
  determine, by the cognitive service, a best cognitive solutions selected from the cognitive solutions, based on ranking;
  send to the user computing device, by the cognitive service, the best cognitive solution;
  wherein the user computing device adjusts one or more devices in the microenvironment based on the cognitive solution.

16. The computer system of claim 15, further comprising the program instructions executable to:
- receive, by the user computing device, the data of the one or more indoor and outdoor sensors, the data of the one or more indoor and outdoor sensors being sent by the one or more indoor and outdoor sensors to the user computing device;
- send to the cognitive service, by the user computing device, the data of the one or more indoor and outdoor sensors; and
- send to the cognitive service, by the user computing device, the profile.

17. The computer system of claim 15, further comprising the program instructions executable to:
- retrieve, from the one or more indoor and outdoor sensors, by the user computing device, the data of the one or more indoor and outdoor sensors;
- send to the cognitive service, by the user computing device, the data of the one or more indoor and outdoor sensors; and
- send to the cognitive service, by the user computing device, the profile.

18. The computer system of claim 15, further comprising the program instructions executable to:
- receive, from the cognitive service, by the user computing device, the cognitive solutions for maintaining the microenvironment; and
- adjust, by the user computing device, the one or more devices based on the cognitive solutions.

19. The computer system of claim 15, wherein the profile of the user of the microenvironment is set up by the user on the user computing device.

20. The computer system of claim 15, wherein the profile of the user of the microenvironment is generated based on historical feedback of the user.

* * * * *